May 13, 1952    O. R. CARPENTER ET AL    2,596,951
AUTOMATIC WELDING APPARATUS

Filed Nov. 9, 1946      6 Sheets-Sheet 1

Otis R. Carpenter &
Frank W. Armstrong Jr.
INVENTORS

BY
*N. H. Holbrook* ATTORNEY

Otis R. Carpenter &
Frank W. Armstrong Jr.
INVENTORS

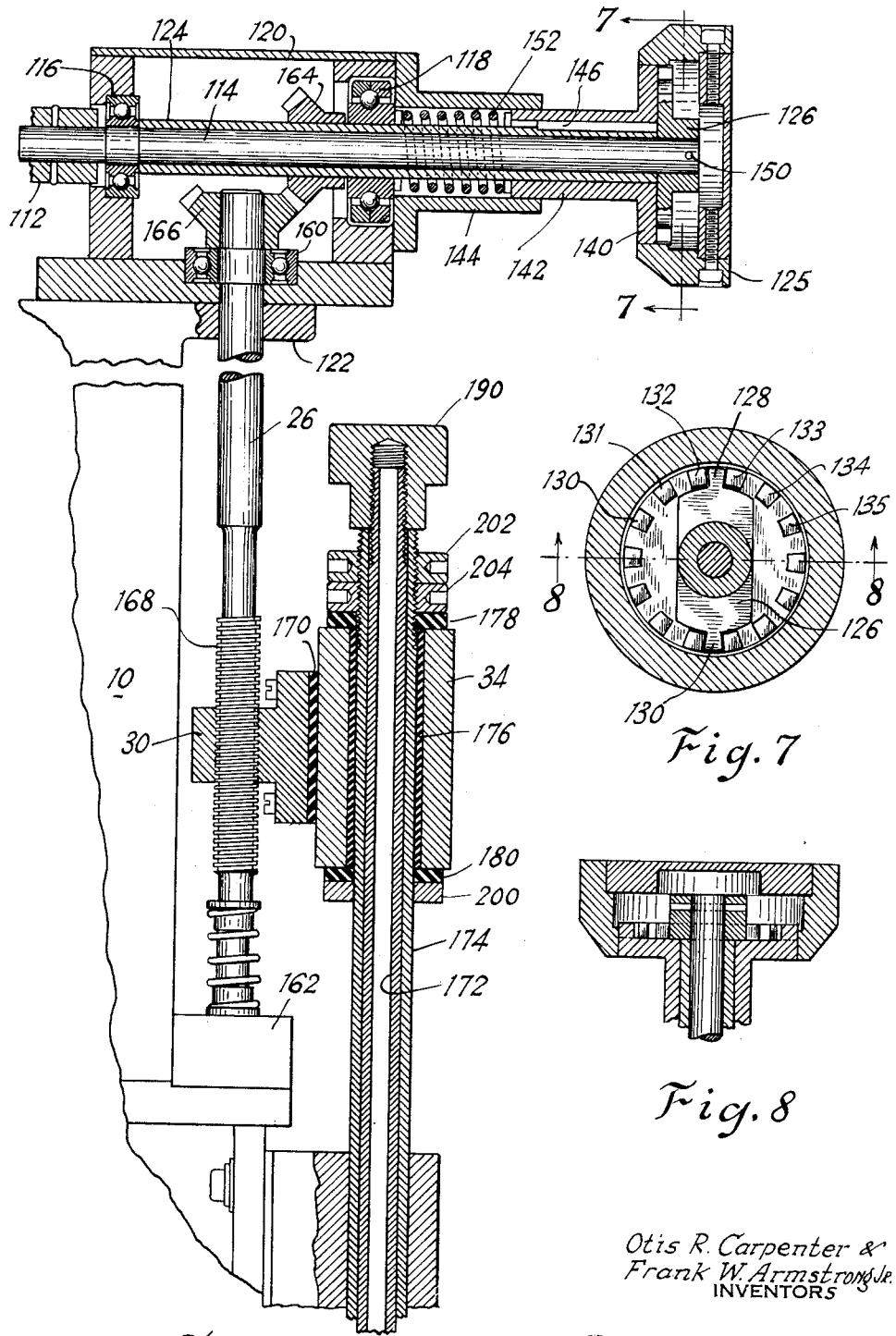

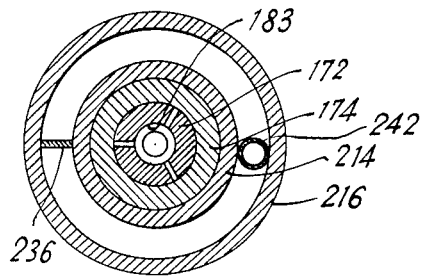
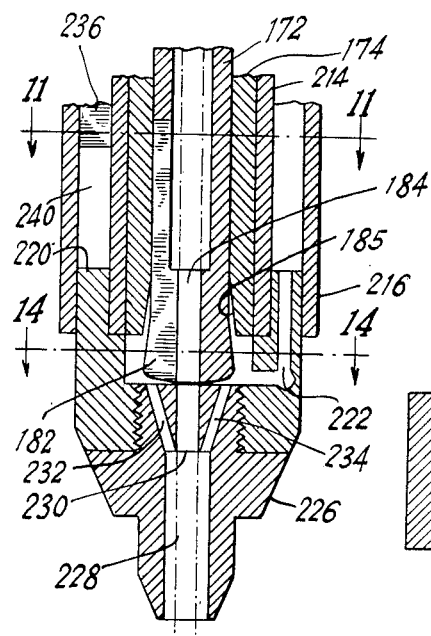
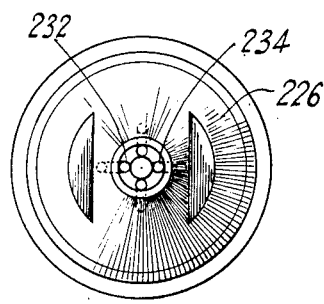
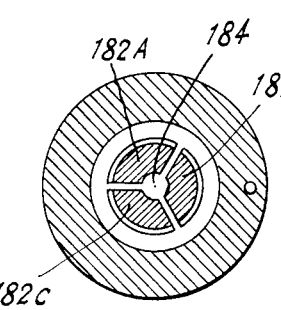
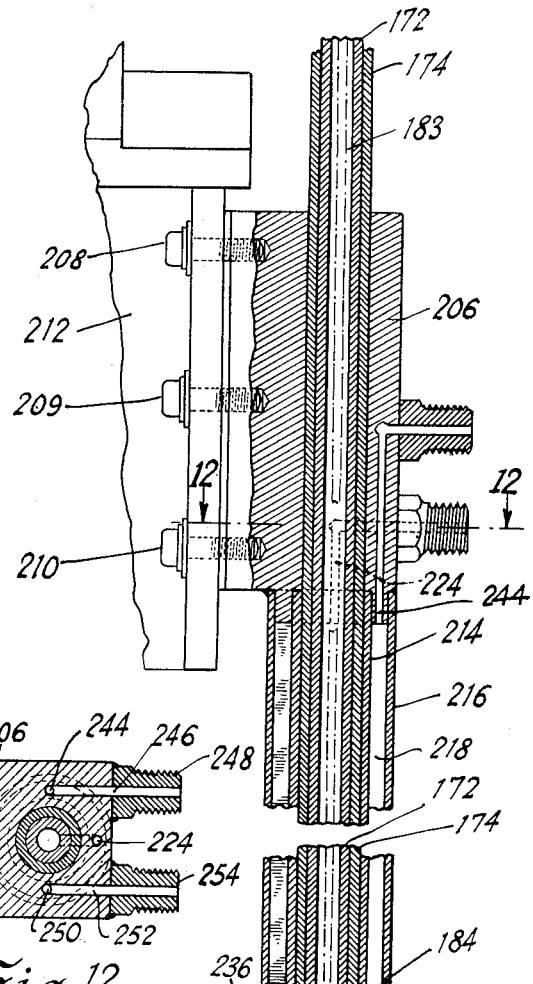
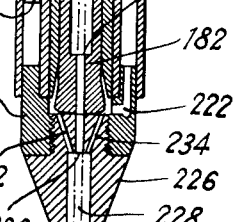

Otis R. Carpenter &
Frank W. Armstrong Jr.
INVENTORS

BY
Holbrook ATTORNEY

Patented May 13, 1952

2,596,951

UNITED STATES PATENT OFFICE 2,596,951

AUTOMATIC WELDING APPARATUS

Otis Richard Carpenter and Frank W. Armstrong, Jr., Barberton, Ohio, assignors to The Babcock & Wilcox Company, Rockleigh, N. J., a corporation of New Jersey Application November 9, 1946, Serial No. 708,857

2 Claims. (Cl. 219—8)

Our invention relates to improvements in welding apparatus, and also to improvements in gas burning apparatus, the latter being of advantageous use in connection with the welding apparatus. The type of welding with which the apparatus is concerned may be considered as gas hydrogen arc welding.

In gas arc welding, the welding operation is conducted through the adjacency of an electric arc and a gas or mixture of gases. The one form of gas arc welding for which our invention is particularly suited is atomic hydrogen welding. In this form of welding, hydrogen is dissociated by an electric arc and it is carried in its dissociated state to the work where upon recombination it liberates an enormous amount of heat which is utilized to perform the welding operation. One way to accomplish this result is to direct a jet of hydrogen across an arc into contact with the work, part of the gas of the jet being dissociated in the work and carried to the work where it recombines and burns.

While our invention is particularly suited for atomic hydrogen welding, many features of construction thereof are capable of broader application. For example, some are particularly suited for application of that type of welding apparatus wherein an arc is maintained between an electrode and the work and a gas is supplied to the arc about the arcing terminal of the electrode and the work. These forms of welding are referred to as gas arc welding.

The objects of the invention

It is an object of our invention to provide improved apparatus for automatic welding by the gas arc method.

Another further object of our invention is to provide means for establishing a stable arc between a plurality of electrodes.

A more specific object of our invention is to employ, in conjunction with a plurality of electrodes whose arcing terminals are placed adjacent the work, means for supplying a jet of gas across and around the terminals of the electrodes, and about the zone of welding.

The invention also includes means to simultaneously feed the electrodes to and from one another to establish and maintain an arc therebetween with which are associated additional means for independently adjusting said electrodes to bring the arc to its optimum condition.

It is also an object of our invention to provide electrode feed mechanism including two variable speed direct current motors operating at high speeds and moving the electrode toward or from the work through a differential mechanism in such a way as to provide an extremely sensitive responsiveness to a control influence for maintaining the arc in an optimum condition. This combination of operative elements eliminates jerky action of the electrodes and eliminates rod pumping.

An additional object of the invention is welding apparatus including a multiplicity of pairs of electrodes providing a plurality of arcs along the line of the weld and arranged for adjustment toward and from each other and adjustment laterally of the line of the weld to maintain optimum welding conditions.

The invention also involves the provision of improved electrode holding and carrying apparatus which also involves a gas torch or nozzle supplying gas to the tip of the electrode.

Another object of this invention is to provide a control means for the electrode operating motors of a differential drive system which will so introduce arc voltage into the electronic circuits so as to control the speed of two variable speed motors and thereby effect stabilized arc conditions.

It is also an object of this invention to interlock the control means of the one drive motor with that of the other drive motor so as to eliminate all jerky operations of the system and so provide a constant arc length under all conditions of welding.

A further object of this invention is the elimination of the "rod feed" control methods common to prior arc welding systems by providing an interlocked and compensating system between the up-driver and the down-driver systems.

Our invention will be better understood from the following description, and other objects of the invention will appear as the description proceeds. The description will have reference to the accompanying drawings, and the scope of the invention will be pointed out in the appended claims.

Brief description of drawing figures

In the drawings:

Fig. 6 is a sectional view showing the driving connections from the driven shaft of the differential mechanism to the collet assembly which includes the electrode holder;

Fig. 7 is a transverse section through the electrode length adjuster by which one electrode of each pair of electrodes may be manually advanced or retracted to position the arc relative to the weld seam. This view is taken on the plane indicated by the section line 7—7 of Fig. 6, looking in the direction of the arrows;

Fig. 8 is a section taken on a plane at right angles to the plane of Fig. 7, and indicated by the section line 8—8 of Fig. 7;

Fig. 9 is a longitudinal section through the remainder of the collet assembly, showing also the collet guide which includes a fluid cooled sleeve for the collet, and electrode holder;

Fig. 10 is an enlarged longitudinal section of the lower end of the Fig. 9 construction;

Fig. 11 is a transverse section through the electrode chuck and collet guide, on the line 11—11 of Fig. 10;

Fig. 12 is a transverse section through the head block of the collet assembly on the line 12—12 of Fig. 9, this view showing parts of the passages by which hydrogen is transmitted to the tip of the collet assembly;

Fig. 13 is a bottom plan looking upwardly at the burner tip of the collet assembly;

Fig. 14 is a transverse section through the collet of the electrode chuck, on the line 14—14 of Fig. 10.

*The atomic hydrogen method*

Figure 1:
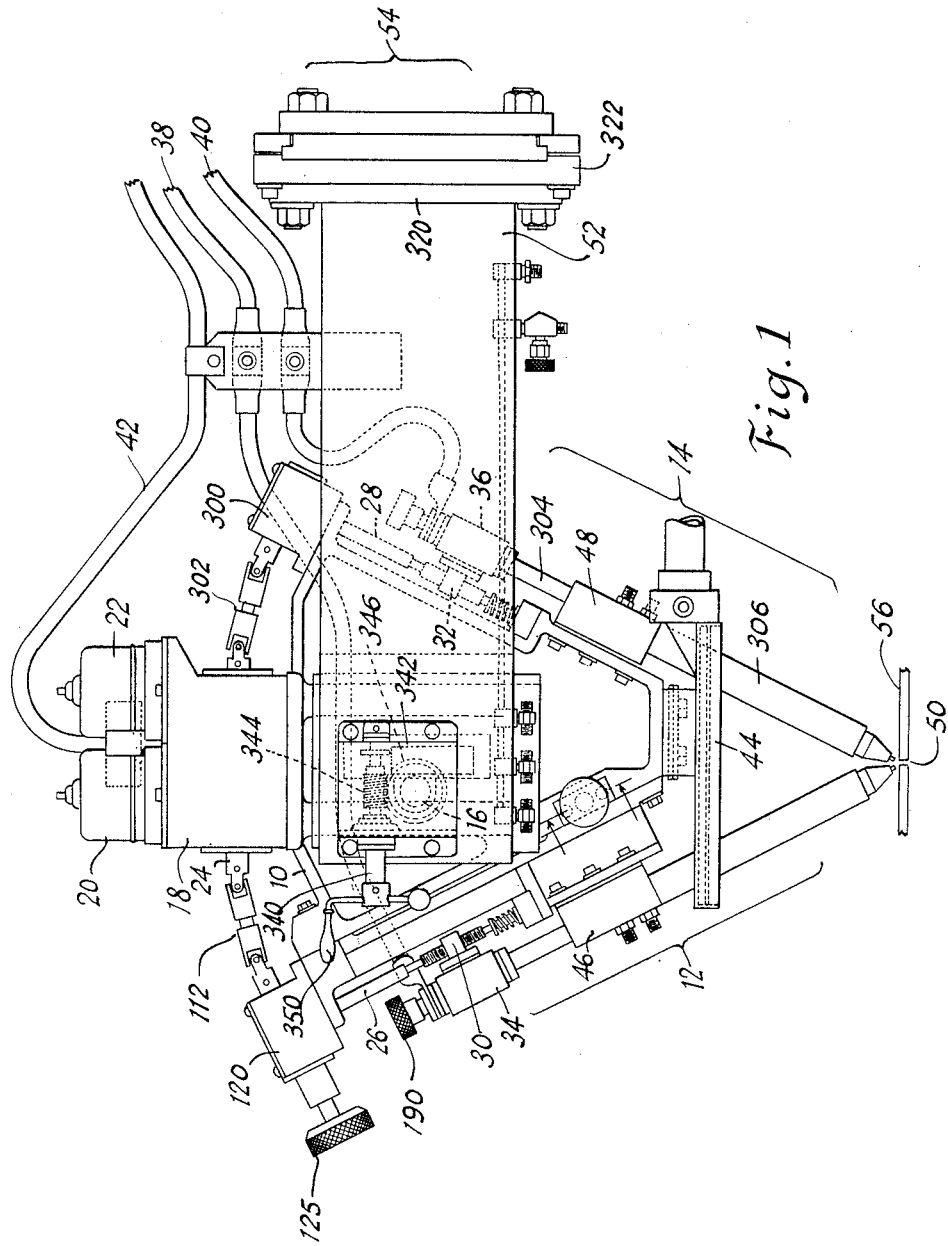
Fig. 1 is a side elevation of our illustrative apparatus, looking along the line of the weld.

The apparatus shown in the drawings is particularly adapted for carrying out welding by the atomic hydrogen process. In this process, di-atomic hydrogen ($H_2$) is dissociated at high temperatures such as those prevailing in an electric arc. In dissociating, a new variety of hydrogen known as atomic hydrogen is formed, and this change is accomplished by the absorption of large amounts of energy. This phenomenon may be considered as analogous to the conversion of heat by the fusion of a solid, or the vaporization of a liquid. The heat thus rendered latent by the dissociation of the hydrogen under the influence of an electric arc is freed by the reassociation of the atomic hydrogen.

In the particular method effected by the illustrative apparatus, an envelope of hydrogen constantly surrounds the tip of each arcing electrode, the hydrogen also acting to exclude oxygen and other gases from the zone of the weld to promote the formation of welds which are free from oxides, nitrides, carbides, or other impurities. This characteristic of the method effected by the illustrative apparatus makes the apparatus advantageous in welding chromium containing alloys which are highly oxidizable. With this method, metals, the oxides of which are not reducible by ordinary hydrogen, may be welded or introduced into welds without oxidation or other detrimental contamination.

*The welding head*

The illustrative apparatus for effecting this welding method involves a plurality of similar welding heads similarly supported and arranged so that each unit presents a pair of arcing electrodes for forming an arc across the line of the weld. The electrodes of each pair are automatically fed toward or away from each other by a pair of high speed direct current series wound (and variable speed) motors operatively moving the electrode holders through the agency of an interposed differential mechanism, the variations in speed of one or both motors being dependent upon the departures of the arc voltage from a predetermined optimum and the corrective effects initiated by the motor control system. The changes in the motor speeds to effect corrective changes in the advance of the electrodes are so effected that the automatic control mechanism operates with a minimum of the mechanical resistance, the electrodes being fed or advanced in small increments of movement which will not induce unstability in the arc.

Each operative welding unit involves a base 10 which is preferably a casting with downwardly converging sides on which the electrode holders 12 and 14 are mounted in correspondingly converging relationship as indicated in Fig. 1 of the drawings. The base 10 is supported by a longitudinally extending rod 16 in such a manner that the unit is turnably adjustable about the rod to adjust the arc with reference to the weld seam in a manner to be later described.

Figure 15:
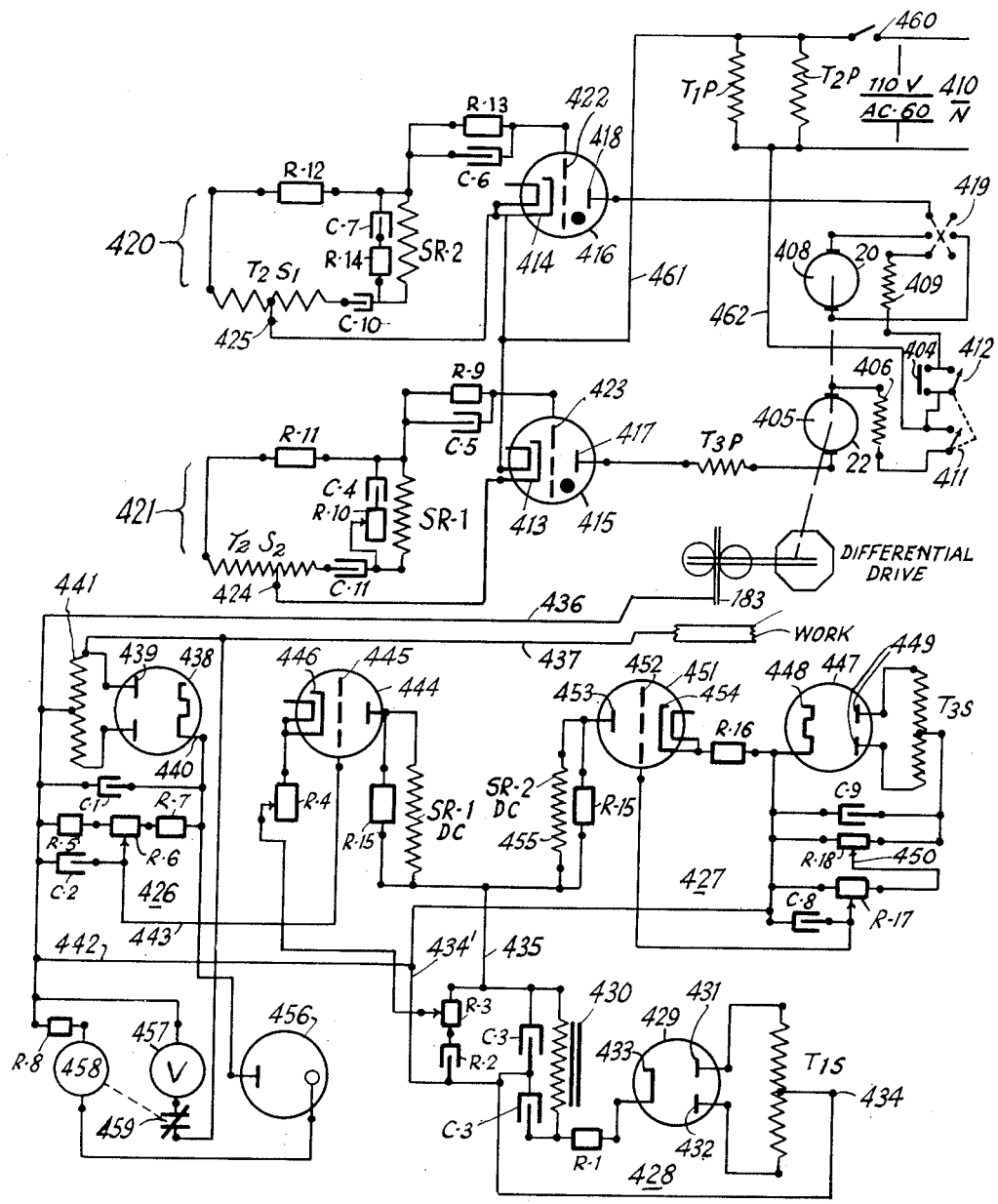
Fig. 15 is a schematic view, or wiring diagram, of the electronic control system for regulating the speeds of the driving electric motors to maintain a stable electric arc.

Each operative welding unit also includes a differential gear mechanism housed within the casing 18 secured to the top of base 10, each of the driving elements of the differential mechanism being individually separately driven by one of the direct current series wound high speed motors 20 and 22. Each unit also involves operative connections between the driven shaft 24 of the differential and screw-threaded shafts 26 and 28 which have their lower parts extending through and co-acting with internally threaded studs 30 and 32 fixed to the head blocks 34 and 36 of the collet assemblies, or electrode holders. Additionally, each welding unit also involves electric arc connections 38 and 40 leading to the respective weld-rods, and electrical connections and systems for the control of the speeds of the motors, functioning from arc voltage variations from an optimum value. Such connections may be in a cable such as 42 and the control systems are shown in Fig. 15. Each unit also has connections whereby cooling fluid is supplied to a heat control shield 44 and to the manifolds 46 and 48 for the cooling systems of the electrodes. Additionally, each unit also involves connections whereby hydrogen is supplied to each electrode for emergence at the weld zone, dissociation, and recombining at the weld seam.

The rod 16 for supporting the welding units is secured to the cantilever structure 52 which may be adjustably secured to a support 54. Preferably, the structure is turnable about its longitudinal axis by such adjustment. In some types of welding the arcing electrodes are movable relative to the work and along the weld seam, and the structure 52 may be so movable. However, in the particular arrangement shown in the drawings the work 56 is movable relative to the electrodes, and in a direction parallel with the axis of the supporting rod 16 so that the weld seam traverses the line of the consecutive arcs produced by the successive welding units.

The differential drive mechanism

Figure 3:
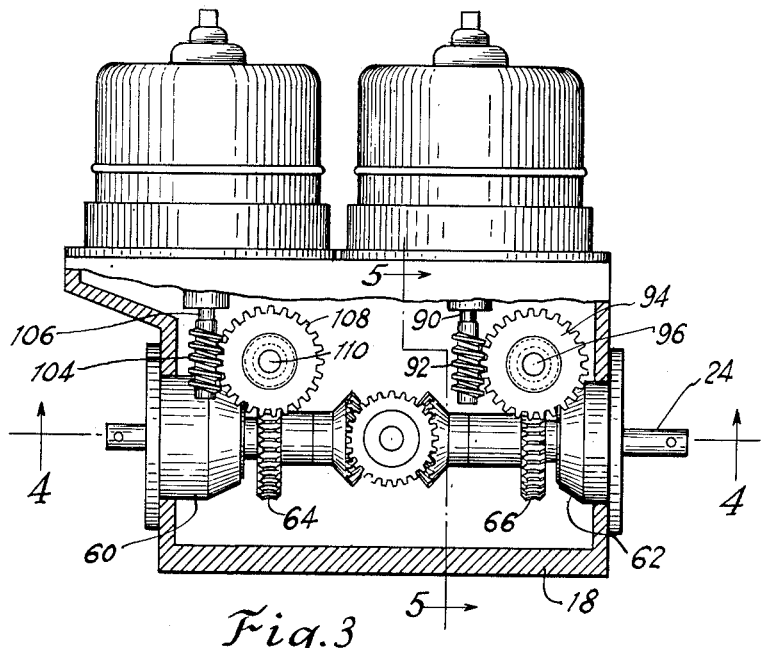
Fig. 3 is, in part, a vertical section through the differential mechanism through which a pair of electrodes have their lengthwise movement regulated so as to control the arc between the tips of the electrode. This view shows the driving motors in side elevation, these motors being operatively connected to the driving elements of the differential mechanism by double reduction worm gearing.
Figure 4:
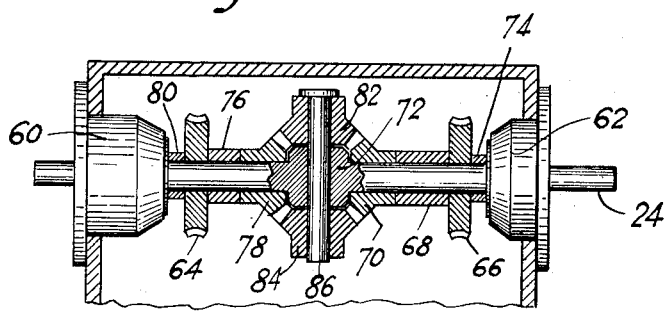
Fig. 4 is a horizontal, or plan section on the line 4—4 of Fig. 3, and looking upwardly.
Figure 5:
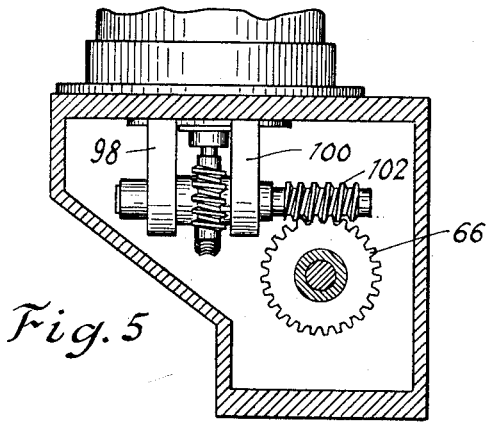
Fig. 5 is a vertical section through the differential housing illustrating the double reduction worm gear drive to each driving element of the differential.

The driving mechanism for the differential shaft 24 is indicated in Figs. 3, 4, and 5. This shaft, as shown in Figs. 3 and 4, is journaled within bearings 60 and 62 secured to the differential housing 18. The shaft extends through the housing, and the elements of the differential mechanism are secured thereon in the manner shown, the differential driving members including the worm gears 64 and 66. Nonrotatively fixed to the worm gear 66 is an inwardly extending sleeve 68, and to the other end of this sleeve there is fixed a bevel gear 70. These three elements 66, 68 and 70 are thus fixed together as a differential driving member which is rotatable upon the differential driven shaft 24. They are maintained in operative position upon this shaft by reason of their location between the center hub 72 of the shaft 24 and an annular spacer 74 interposed, as shown, between the worm gear 66 and the bearing 62.

On the left hand side of the differential hub 72, the worm gear 64 is nonrotatively combined with a sleeve 76 and the bevel gear 78 to form the other driving member of the differential, this member being maintained in position against the hub 72 by the spacer 80 which is interposed between the bearing 60 and the worm gear 64.

Constantly meshing with the bevel gears 70 and 78 are the differential balancing bevel gears 82 and 84. The latter are preferably rotatively mounted upon a pin or trunnion 86 which passes through an opening in the differential hub 72.

The worm gear 66 of the right hand driving member of the differential (Figs. 3 and 4) is driven from the shaft 90 of the motor 22 by means of double reduction worm gearing. This includes the worm 92, fixed upon the shaft 90 of motor 22 and meshing with the worm gear 94 fixed upon a counter-shaft 96. This counter-shaft is journaled within supports 98 and 100 depending from the top of the differential housing 18 as shown in Fig. 5. The shaft 94 has nonrotatively fixed thereon a worm 102 which meshes with and drives the worm gear 66 of the right hand driven member of the differential. Similarly, the worm gear 64 is driven through double reduction gearing including the worm 104 fixed upon the shaft 106 of the motor 20, this worm meshing with and driving a worm gear 108 fixed upon a counter-shaft 110 disposed similarly to the counter-shaft 96 and having a worm thereon corresponding to the worm 102 and meshing with and driving the worm gear 64.

At the left hand end of the shaft 24 is a universal joint 112 for directly driving the sub-shaft 114 (Fig. 6). This shaft is rotatively mounted in bearings 116 and 118 in the opposite walls of a gear box 120. The gear box is fixed to a bracket 122 rigidly secured to the frame 10 of the welding unit.

The electrode length adjustor

The sub-shaft 114 is mounted within a sleeve 124 which is normally rotatable with the shaft, but is disengageable therefrom by the electrode length adjustor hand wheel structure 125, shown at the right hand upper part of Fig. 6. This structure is hollow and within it there is mounted the clutch member 126 fixed on the sub-shaft 114. This clutch member has teeth such as 128 and 130, at its opposite ends for normal disposal within the openings between the successive teeth such as 130—135 arranged circumferentially of the flange 140 which extends radially from the hub 142 on the hand wheel structure. This hub is a sleeve-like extension which is slidable within the sleeve 144 fixed to the gear box 120, and the hub is non-rotatably related to the sleeve 124 by the key 146. The movement of the hub 142 to the right is limited by contact with the clutch member 126 which is secured to the shaft 114 by the pin 150. Normally, the hub 142 is maintained at the extreme right hand end of its path of movement by the coil spring 152, the sub-shaft 114 and the sleeve 124 being thus normally non-rotatively secured together so that they are driven as a unit. When, however, it is desired to adjust the associated electrode, the hand wheel 125 is pushed inwardly against the force spring 152 to disengage the clutch teeth 128 and 130 from the co-acting teeth upon the flange 140. This interrupts the driving connection between the sub-shaft 114 with the sleeve 124 and permits the latter to be turned manually so as to adjust the length of the electrode through the further agency of the mechanism to be presently described.

The electrode holder

The upright electrode shaft 26 has its upper end journaled in a bearing 160 secured in the bottom of the gear box 120 and its lower end mounted in a bearing in a block 162 secured to the base 10. This shaft is normally rotated by the sleeve 124 through the intermediacy of the intermeshing bevel gears 164 and 166. The former is fixed to the sleeve 124 and the latter is fixed to the upper end of the shaft 26. The lower part of the shaft 26 includes an externally screw-threaded section 168 threaded through the internally screw-threaded stud 30. The latter is secured to the head block 34 of the collet assembly 12, but is electrically insulated therefrom by means including insulating member 170.

Slidably mounted within the head block 34 are the telescoping inner and outer tubular sections 172 and 174 of the electrode chuck. These sections are in the form of telescoping tubular sections having a sliding fit, with the outer tubular section sliding within an electrical insulating sleeve 176 disposed within an opening in the head block 34. At the upper and lower ends of this sleeve are annular insulating sections 178 and 180 respectively for completing the electrical insulation between the head block 34 and the electrode chuck.

The inner tubular section 172 has integral therewith at its lower end a collet section 182 comprising three radial portions 182A, 182B and 182C (Fig. 14) which are retractable to grip the tungsten electrode 183 which extends through the tubular section 172 and through the opening 184 centrally of the collet sections. The outer tubular section 174 of the collet assembly has its lower end outwardly bevelled as at 185 so that when the tubular sections 172 and 174 are movable relative to each other, the inclined surfaces at the lower ends of the section 174 cooperate with the tapered collet sections 182A—182C to cause these sections to grip the tungsten electrode 183.

Relative movement between the tubular sections 172 and 174 of the collet assembly is effected by the turning of the terminal screw-threaded cap nut 190 screw-threaded upon the upper end of the tubular section 172. When this nut is turned in one direction, it will raise the collet sections 182A—182C so that they are caused to contract and grip the tungsten electrode, the nut 190 reacting against the top of the outer tubular section 174. The latter is fixed with reference to the head block 134 by the collar 200 and the spanner nuts 202 and 204. The collar 200 is preferably brazed to the outer tubular section 174 and the spanner nuts 202 and 204 are in screw-threaded engagement with the externally threaded upper end of the outer tubular section 174.

*The collet guide*

The collet electrode holder above described is slidably guided by a structure shown in Fig. 9. This structure includes a collet guide head block 206 rigidly secured by the cap screws 208—210 to a bracket 212 which is fixed to the welding unit base 10. The outer tubular section 174 of the electrode chuck is downwardly and upwardly slidable within an upright bore in the head block 206, and below the head block, member 174 is slidable within a guide formed by a fluid cooled casing consisting of an inner tube 214 fixed to the head block and an outer tube 216 likewise fixed to the head block and of a diameter greater than the diameter of the inner tube 214 to form therebetween the cooling fluid chamber 218. This chamber extends to the electrode tip socket member 220 which is fixed within the tube 216 and forms the bottom of the fluid cooling chamber between the inner and outer tubes 214 and 216.

Within the electrode socket member 220 is a hydrogen passage 222 which is connected with a hydrogen inlet passage 224 (in the head block 206) by a tube extending through the cooling fluid chamber 218, or by a passage formed between baffles which are secured to the inner and outer tubes 214 and 216 to form a separate channel for the direct flow of hydrogen from the inlet passage 224 to the passage 222. In either case, the hydrogen is subject to the cooling influence of the cooling fluid as it proceeds to the electrode tip 226. The latter has a central cylindrical recess 228 considerably larger than the diameter of the tungsten electrode and larger than the diameter of the electrode tip passage 230 through which the electrode extends to the arcing zone. The electrode extends centrally of the recess 228 and in the space between the electrode and the sides of this recess there is provided an envelope of hydrogen flowing from the lower end of the electrode, this being effected by an annular series of hydrogen passages which are represented in Fig. 9 by the downwardly converging passages 232 and 234.

To attain the maximum thermal productive effect of the cooling fluid within the chamber 218, this chamber has extending longitudinally thereof a radial baffle 236. The inlet for the cooling fluid is disposed on one side of this baffle and the outlet on the other side of the baffle.

Preferably, the channel for connecting the hydrogen inlet 206 to the hydrogen passage 222 is diametrically opposite the baffle 236 so that the fluid cooling chamber 218 is separated into two sections connected only by the passage 240 between the bottom of the baffle 236 and the bottom of the chamber formed by the electrode tip socket member 220. The hydrogen tube is indicated at 242 as substantially closing off the fluid cooling chamber 218 into two sections. With this construction, the arrangement of the hydrogen passages and the inlets and outlets for the cooling fluid are indicated in Fig. 12. The inlet 244 for the cooling fluid is connected to that part of the chamber 218 shown at its upper part in Fig. 12 and this inlet is connected with a passage 246 extending through a screw-threaded connector 248 welded to the head block 206. The outlet 250 for the cooling fluid is connected to a passage 252 and similarly extending to a connector 254 similarly fixed to the head block 206.

Normally, the position of the collet sections 182A—182C of the electrode chuck are considerably above the electrode tip 226 so as to provide for the automatic advance of the electrode into the arcing socket 228 during normal operation of the apparatus, and it will be understood that the described operation of the hand wheel 124 of Fig. 6 can result in manual advance of the electrode at the will of the operator. Although the associated electrode holder 14 is constructed similar to that of the electrode holder 12, it is not provided with an electrode length adjustor similar to that shown in Fig. 6. This is not necessary because the position of the arc with reference to the horizontal plane to the zone of the work may be sufficiently regulated by the electrode length adjustor for the other electrode and electrode holder. It will be seen from the inspection of Fig. 1 that the electrode in the holder 14 is operated generally by a mechanism which is quite similar to that described for the electrode holder 12. The gear casing 300 for its driving mechanism is shown. Journalled within this casing is a sub-shaft connected to the shaft 24 by the universal joint 302 and the collet tube is indicated at 304 as movable within the head block 48 which is secured to the right hand side of the base 10. This block is also shown as having a collet guide tube 306 extending downwardly therefrom in downwardly converging relationship to the outer tube 214 to the collet guide assembly described above.

Figure 2:
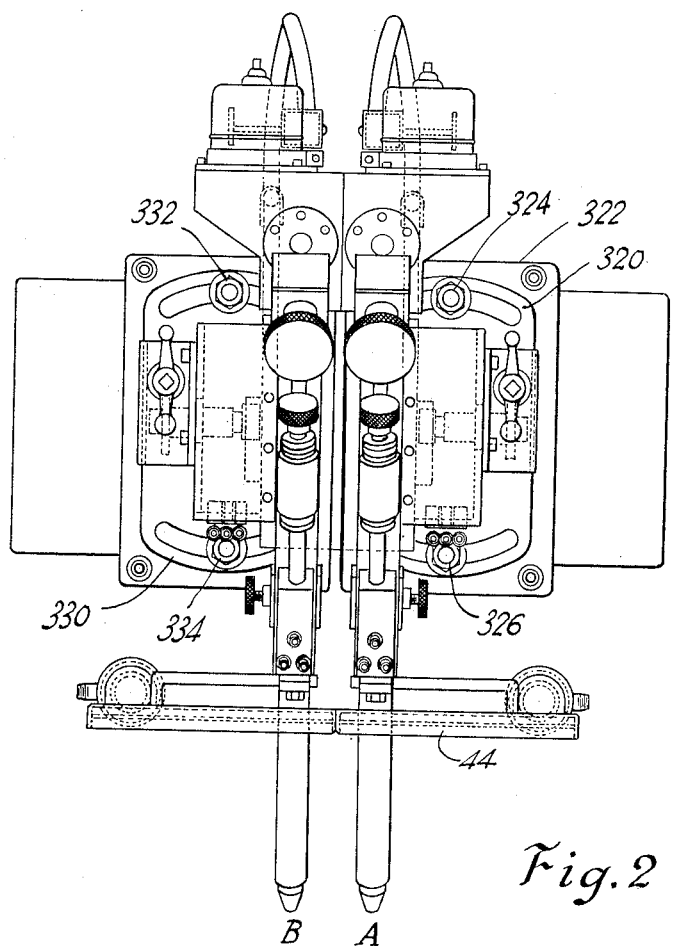
Fig. 2 is a front elevation of the illustrative apparatus.

In Fig. 2 of the drawings there are shown two operative welding units A and B. The second is similar to the one above described except that that one is a right and the other is a left. A greater number of such units may be employed. The unit A is shown as being secured to the sliding plate 320 which may be secured to the fixed plate 322 by the bolts 324 and 326. When these bolts are loosened, the plane of the longitudinal axes of the electrodes of any single unit may be adjusted longitudinally of the weld seam so as to obtain the proper heating effect with reference to the heating effect of the adjoining units. The welding unit B is similarly adjustable by reason of its support through the sliding plate 330, having the bolts 332 and 334 normally securing the sliding plate 330 to the backing plate 322.

Each entire welding unit as shown in Fig. 1 is adjustable turnably about the shaft 16 by mechanism which includes a shaft 340 journalled in a gear casing 342 and having fixed thereon a worm 344 meshing with a worm gear 346 which is fixed to the shaft 16. The gear casing is fixed to the cantilever structure 52, and, therefore, when the shaft 340 is turned by manual operation of the crank 350, it will be seen that the entire welding unit is swung about the axis of the rod 16 so as to adjust the arc minutely transversely of the weld seam 50.

The two series wound high speed direct current motors 20 and 22 are normally driven in opposite directions and the speed of one of these motors is controlled directly from variations in the arc voltage by an electronic control system to be presently described. It is claimed in our application Ser. No. 708,858, filed on November 9, 1946, which is co-pending herewith. This co-pending application has now matured to Patent No. 2,458,503, issued January 11, 1949. When the arc voltage varies from an optimum value, the speed of one of the motors, for example, motor 22 is changed to an extent that is a small percentage of its normal speed to exert an arc voltage corrective effect. Practically instantaneously with this change the control system causes the other motor to also change its speed to exert a corrective effect upon the electrode moving mechanism which augments the corrective effect of the first motor. With this arrangement, the entire corrective effect is not produced by a relatively large change in the R. P. M. of one motor, and a considerable reduction in the inertia resistance to the change in speed is effected. The electrode operating mechanism is thus far more sensitive to variations of the arc voltage from a predetermined optimum value and the changes are effected much more quickly than in mechanisms which do not employ two variable speed motors. Furthermore, because both motors are direct current motors, no difficulty is experienced in matching the speed of an alternating current motor to the direct current motor which is apt to cause slow response of the driving mechanism and jerky action of the electrode.

*The electronic control systems*

With the above described electrode feed mechanism the rate of advance of each electrode such as 183 is a direct function of the difference between the speed of the motors 20 and 22 and with the motors operating at high speeds and in opposite directions, the rate of electrode advance is quickly and accurately controlled by effecting relatively small changes in their rates of operation. Thus, if the speed of the motor 20 is increased 10%, there is a double corrective effect upon the movement of the electrode if the speed of the motor 22 is simultaneously decreased 10%. Such changes in the motor speed are effected by the electronic control systems indicated in Fig. 15. Here, the series wound driving motor 22 is shown as having an armature 405 with a field winding 406 and the similarly wound motor 20 is indicated as having the armature 408 and the field winding 409.

An alternating current source 410 is connected on the one side by lead 462 to the starting switches 411 and 412 and then to the respective motor fields 406 and 409. An "inch" switch 404 is connected in shunt with starting switch 412. The other side of the alternating current source is connected by lead 461 to the cathodes 413 and 414 of the tubes 415 and 416. These are grid controlled thyratrons the anode output of which is connected, in the case of tube 415, from anode 417 in series relation to the primary T3P of a voltage transformer T3 to armature 405 and, in the case of tube 416, from anode 418 through reversing switch 419 to armature 408. In this manner, pulsating direct current, controlled by the grid action of their respective thyratron tubes, is supplied to the armatures of each of the drive motors 20 and 22. The motors rotate in opposite directions and hence when operating through the differential gear drive the speed and direction of feed of the electrode 183 is the resultant of the difference of speed of the two drive motors.

The thyratron tube output is controlled by a grid circuit 420 for the one motor and by the grid circuit 421 for the other motor. Each of these circuits includes a phase-shift bridge having, in the case of circuit 420, the grid biasing means provided by the resistance R-13 and the capacitor C-6 connected to the alternating current winding of the saturable reactor SR-2 having in shunt therewith the series capacitor and resistor circuit C-7 and R-14. One side of the above winding is connected in series relation with capacitor C-10 and the secondary winding T2S1 of transformer T2. The opposite end of the alternating current winding of the saturable reactor SR-2 is connected in series relation with resistance R-12 and to the secondary winding T2S1. The center tap 425 of the transformer winding T2S1 is connected to the cathode 414 of thyratron tube 416 thus completing the grid control circuit means of valve 416.

In a similar manner grid 423 of thyratron tube 415 is controlled by the grid circuit 421 having a grid biasing means consisting of resistance R-9 and capacitor C-5 and the phase-shift bridge circuit consisting of the alternating current winding of the saturable reactor SR-1 having in shunt therewith the series capacitor-resistor circuit including capacitor C-4 and the variable resistance R-10. The one end of the saturable reactor winding is connected in series relation with capacitor C-11 and to the secondary winding T2S2 of transformer T2. The other end is connected in series relation with resistor R-11 and the secondary winding T2S2. The center tap 424 of transformer winding T2S2 is connected to the cathode 413 of thyratron tube 415 thus completing the means for providing grid control of tube 415.

The saturable reactors described above as elements of the grid control circuits provide the variable elements by means of which the grid potentials of thyratron tubes 415 and 416 may be controlled. Means for control of these variable elements are provided by the voltage sensitive circuits shown in the drawing by circuit 426 and circuit 427.

The direct current source for control of the variable elements SR-1DC and SR-2DC is provided for by the rectifier circuit 428. This circuit consists of rectifier tube 429 having the cathode 433 and anodes 431 and 432 which are connected to the transformer winding T1S. The center tap 434 of this winding is connected to provide the common output 434' for voltage sensitive circuits 426 and 427 on the one side, and the other outlet of the rectifier circuit is connected through a filter system (consisting of choke coil 430, resistance R-1 and capacitors C-3) to lead 435 which is common to both of the voltage sensitive circuits 426 and 427.

The degree of control of each of the voltage sensitive circuits which is introduced by means of the saturable reactors into the control grid circuits of the thyratron tubes 415 and 416 is determined by the value of the arc voltage at the work. This voltage is introduced into the circuit by leads 436 and 437 to the transformer winding 441 through the rectifier tube 438 having a cathode 440 and an anode 439. The output of this tube having a filtering system (consisting of shunt capacitor C-1, series-shunt resistors R-5, R-6 and R-7 and capacitor C-2) connected on the one side of grid 445 of triode 444 and on the other to common lead 442 of the direct current supply circuit 428. When the value of the arc voltage changes from its preset value (determined by variable resistance R-6) then the potential of grid 445 of triode 444 is changed in value and the direct current field of reactor winding SR-1DC varies accordingly.

The variation of direct current field of SR-1DC alters the output of thyratron tube 415. In the anode circuit of this thyratron a primary winding T3P of a voltage transformer is connected in series relationship so that variations in the output of tube 415 causes a corresponding voltage variation to occur in the transformer secondary T3S of the voltage sensitive circuit 427 by virtue of the alternating current component of the pulsating direct current output of thyratron tube 415. This voltage is rectified by diode 447 having the cathode 448 and anode 449. In shunt relationship with the output of tube 447 is capacitor C-9 and resistance R-18 which is provided with the variable tap 450 to which in series parallel relationship is connected R-17. The control member 452 of triode 451 is connected to the variable connection of R-17. By means of adjustment of the value of this resistance an adjustment of the voltage output may be made. Variations in the grid potential of control member 452 as caused by variations in the output of thyratron tube 415 cause a change in the direct current field of the direct current winding 455 of saturable reactor SR-2 having shunt resistor R-15. The change in the field of this member alters the output of thyratron tube 416 by means of a phase shift and consequently alters the speed of motor 20.

When high open circuit arc voltages as may be employed in atomic hydrogen welding are used, a circuit consisting of diode tube 456, relay 458 and contact 459, and resistor R-8 is used to prevent application of the open circuit voltage to meter 457 when the arc has not been established.

Variable resistance R-4 is connected in series relation with cathode 446 of triode 444 and the movable arm of resistance R-3 to adjust the fixed bias current of triode 445 thereby providing for adjustment of the variable element SR-1DC and in consequence providing a balancing system to aid in the elimination of "pumping" of the electrode.

When the illustrated control system is made operative power switch 460 is moved to the closed position energizing the transformer primaries T1P and T2P and providing for connection of one side of the supply by lead 461 to the cathodes of valve tubes 415 and 416 the outputs of which are connected to the armatures of series wound motors 20 and 22. Upon closing switches 411 and 412 the supply circuit to the motors is completed by means of lead 462 and pulsating direct current is supplied to each motor.

The control of the current to each of the motors is a function of the potential established on each of the control members 422 and 423 of the thyratron tubes 415 and 416. Each of the thyratron tubes is thus arranged in its own operative circuit and control of one motor is independent of the other except as provided for by the interlocking of the control circuit 427 into the output of thyratron tube 415 by the voltage transformer T3.

When the motors are energized and the electrode 183 fed to work 50 and an arc established, the arc voltage is held at a value preset by the voltage divider system provided for by circuit 426 and specifically by the presetting of variable resistance R-6. As long as this preset arc voltage is maintained and the arc length held constant the output of the two voltage sensitive circuits 426 and 427 to the control members 445 and 452 of their respective triodes 444 and 451 remains at the preset value holding a constant direct current field on the variable elements SR-1DC and SR-2DC. This produces a constant speed in each of the drive motors.

When the arc voltage or arc length varies from a preset value as arranged by adjustment of resistance R-6 a corresponding change occurs in the direct current field of SR-1DC and results in a phase shift of the circuit 421. This alters the output from anode 417 resulting in a slowing or speeding up of the driver motor 22.

At the same time an output change of anode 417 of thyratron tube 415 changes the voltage pick-up of transformer T-3, the primary of which is in series relation with the output. The consequent change in the secondary T3S of this transformer changes the output of the sensitive circuit 427 and this in turn changes the current through the direct current winding of variable element SR-2DC and consequently causes a phase shift in the control circuit 420 of thyratron tube 416. The output of this tube then alters the speed of the driver motor 20 so that there is obtained an interlocking relationship of the one driver to the other. Thus if the variation in arc voltage is such as to require greater rod feed this interlocking system will result in the one motor 22 speeding up and the other motor 20 slowing down. If the arc welding current is suddenly increased from one low value to another high value there will result a momentary arc voltage increase which will speed motor 20 and slow up motor 22, the difference in speed-up of the two drivers determining the rate of rod feed. By this means the hand control of the rod feed common to most arc welding operations is made automatic for any arc voltage or current adjustment.

*Résumé*

The illustrative apparatus includes a plurality of welding heads each of which is separately driven by a twin motor assembly. The motors of each assembly are effective in regulating the advance of the electrode through a differential mechanism with a double worm and gear reduction interposed between each motor shaft and the differential. Each leg of this drive is connected through a set of bevel gears to a threaded drive rod. This screw drives a nut which is attached to the main collet assembly, this assembly holding the tungsten electrode and providing for feeding two inches of the tungsten into the arc. After that two inch length of the electrode is fed to the arc, the grip of the electrode holder upon the electrode must be released by releasing the collet moving the tungsten head or holding the tungsten while the nut at the head of the collet assembly is threaded back toward the upper part of its path of movement.

Of the two series wound motors for each welding head, one is operated in a direction so as to move the tungsten electrodes in an upward direction, and the other is operated so as to move the tungsten in a downward direction. Since these motors drive through a differential mechanism, the movement of the tungstens is in accordance with the resultant differential in speed of the two motors. Reversal of the direction of electrode movement does not require complete stopping and starting of a motor with the attendant overcoming of the inertia of the motor together with its driving mechanism, but simply requires the speeding up or the slowing down of one or both of the motors.

The motors are preferably of a type designed to run at a maximum speed of 10,000 R. P. M., and in the normal welding control operation of the motors, their speeds are varying between 1500 R. P. M. and 5000 R. P. M.

The differential gear assembly and the bevel gear casing are all of ball bearing construction. The differential gear mechanism is arranged to run in oil, the oil element being indicated on the front of the casing.

Each of the main collet assemblies described above operate in a stainless steel water cooled nozzle guide. Each guide consists of an inner and outer tube with the coolant chamber therebetween baffled off to provide for water circulation to the electrode tip and back. Also provided is a small internal copper tube which introduces hydrogen at the inside, and results in an envelope of hydrogen around each electrode tip. Means are provided for hydrogen and water connections at the top of each water guide.

The tungsten electrodes are placed in their collets through the tips. Each tip is removable and replaceable so as to provide for different changes in collet sizes and provide for the cleaning of the tips. Collets are removed by unscrewing the brass nut at the top of the collet assembly, removing the tip, and removing the collet through the bottom opening.

The screw and nut drive provided for operating each tungsten collet assembly into the arc will run out approximately two inches of tungsten. When this amount of electrode has been burned it is necessary to manually release the collet and drive the head in an upward direction until the nut again is positioned at the top of the drive screw. The head is run in an upward direction by placing the "up-down" switch for that head in the up position, and pushing the button of the inch switch or by turning on the weld switch, with the main weld switch in the off position.

Screws are provided for positioning each welding head along the weld seam. These are so arranged that the heads may be brought together on 1½" centers or separated to any distances within a 14" separation of the side mounting plates. These adjustments are made by turning the screw threads located on the right side of the mounting plates. These adjustments are provided so that one or more of the heads may be adjusted to provide the correct degree of preheat for welding by the third head. It will, of course, be clear that these center distances between the arcs will be changed, depending upon the welding speed, the amount of heat, the type of material welded, and the type of weld. It does, however, provide extreme flexibility of the adjustment of the heat input into the work.

Water distribution to the electrode collet guides is provided by means of a manifold baffle which acts as a heat shield deflecting the welding heat from the main part of each welding head or unit. The central part of the baffle makes up the outlet and is connected to one side of each collet guide. The inlet of each collet guide is connected to those connections at the outside rim of the baffle.

In addition to the water cooling system described above, an exhaust system is provided to remove hot air from the arcs and to prevent hydrogen accumulation. Preferably such an exhaust system is provided and attached under the manifold water baffle which provides the heat shield.

Each collet guide is supplied with a separate source of hydrogen. Hydrogen enters each head at the center behind the terminal board and a pressure of about five lbs. (5 p. s. i.) is preferably utilized. In the operation of the described apparatus it is advisable to have the air exhaust system in operation and to purge all lines before lighting the hydrogen. The hydrogen is supplied through a solenoid valve which opens when water flows in the head and through the water flow switch. This water flow switch and the valve are connected in series to assure the flow of water before the hydrogen can be turned on.

What is claimed is:

1. In electric welding apparatus of the type in which the relative positions of a pair of electrodes are adjusted by mechanism operable by the driven element of a differential gearing having a pair of driving elements, a pair of high speed direct current, electric motors each operatively connected to one of said driving elements, said motors rotating the driving elements in opposite directions and, when the welding voltage is at a predetermined value, at equal speeds to maintain the driven element stationary; and means, responsive to variations in the welding voltage relative to the predetermined value, for varying the relative speeds of said motors to rotate the driven element to adjust the relative positions of said electrodes; said motors operating at a speed in excess of 5000 R. P. M. so that any such responsive variation in the speeds, effective to produce appreciable movement of the driven element, represents only a small percentage of the motor speeds and the change in rotational inertia is substantially negligible, whereby a fine adjustment of the electrode positions is effected substantially instantaneously in response to such variations in the welding voltage.

2. In gaseous electric welding apparatus of the type in which a pair of substantially non-fusible electrodes are maintained in predetermined positional relation by mechanism operable by the driven element of a differential gearing having a pair of driving elements, a pair of high speed direct current, electric motors each operatively connected to one of said driving elements, said motors rotating the driving elements in opposite directions and, when the welding voltage is at a predetermined value, at equal speeds to maintain the driven element stationary; and means, responsive to variations in the welding voltage relative to the predetermined value, for varying the relative speeds of said motors to rotate the driven element to adjust the relative positions of the electrodes; said motors operating at a speed in excess of 5000 R. P. M. so that any such responsive variation in the speeds, effective to produce appreciable movement of the driven element, represents only a small percentage of the motor speeds and the change in rotational inertia is substantially negligible, whereby a fine adjustment of the electrode positions is effected substantially instantaneously in response to such variations in the welding voltage.

OTIS RICHARD CARPENTER.
FRANK W. ARMSTRONG, JR.

REFERENCES CITED

The following references are of record in the file of this patent:

UNITED STATES PATENTS

| Number | Name | Date |
|---|---|---|
| 1,289,294 | Standeford | Dec. 31, 1918 |
| 1,374,404 | Soons et al. | Apr. 12, 1921 |
| 1,514,591 | Smyser | Nov. 4, 1924 |
| 1,514,592 | Smyser | Nov. 4, 1924 |
| 1,563,612 | Cutler et al. | Dec. 1, 1925 |
| 1,677,657 | Roebuck | July 17, 1928 |
| 2,061,671 | Riemenschneider | Nov. 24, 1936 |
| 2,063,467 | Southgate | Dec. 8, 1936 |
| 2,065,891 | Hall | Dec. 29, 1936 |

FOREIGN PATENTS

| Number | Country | Date |
|---|---|---|
| 412,892 | Great Britain | July 5, 1934 |